US012683180B2

(12) United States Patent
Vidarte Gordillo et al.

(10) Patent No.: US 12,683,180 B2
(45) Date of Patent: Jul. 14, 2026

(54) DEVICE FOR PRODUCING ENERGY AND USE THEREOF

(71) Applicant: ARKYNE TECHNOLOGIES S.L., Viladecans (ES)

(72) Inventors: Pablo Manuel Vidarte Gordillo, Viladecans (ES); Rubén Darío Costa Perez, Viladecans (ES); Cibeles Nunziata Muñoz, Viladecans (ES); Lukasz Kowalski, Viladecans (ES); John Arturo Morales Matos, Viladecans (ES); Naroa Uria Moltó, Viladecans (ES)

(73) Assignee: ARKYNE TECHNOLOGIES S.L., Viladecans (ES)

( * ) Notice: Subject to any disclaimer, the term of this patent is extended or adjusted under 35 U.S.C. 154(b) by 619 days.

(21) Appl. No.: 18/245,751

(22) PCT Filed: Sep. 17, 2021

(86) PCT No.: PCT/EP2021/075621
§ 371 (c)(1),
(2) Date: Mar. 17, 2023

(87) PCT Pub. No.: WO2022/058500
PCT Pub. Date: Mar. 24, 2022

(65) Prior Publication Data
US 2024/0266573 A1     Aug. 8, 2024

(30) Foreign Application Priority Data

Sep. 18, 2020     (EP) ..................................... 20382828

(51) Int. Cl.
*H01M 8/16* (2006.01)
*C25B 1/02* (2006.01)
*C25B 5/00* (2006.01)
*H01M 4/96* (2006.01)

(52) U.S. Cl.
CPC ................. *H01M 8/16* (2013.01); *C25B 1/02* (2013.01); *C25B 5/00* (2013.01); *H01M 4/96* (2013.01); *H01M 2250/10* (2013.01)

(58) Field of Classification Search
CPC .. H01M 8/16; H01M 4/96; C25B 1/02; C25B 5/00
See application file for complete search history.

(56) References Cited

U.S. PATENT DOCUMENTS

2017/0077541 A1 *     3/2017     Togo ...................... H01M 8/16

OTHER PUBLICATIONS

International Search Report issued in PCT/EP2021/075621, mailed Dec. 20, 2021.

* cited by examiner

*Primary Examiner* — Karie O'Neill Apicella
(74) *Attorney, Agent, or Firm* — ICE MILLER LLP

(57) ABSTRACT
The present invention relates to a device for producing energy and to the use of said device for producing and/or storing energy.

20 Claims, 8 Drawing Sheets

Double-layer          Single-layer

DEVICE FOR PRODUCING ENERGY AND USE THEREOF

FIELD OF THE INVENTION

The present invention relates to the field of energy. In particular, the present invention relates to a device capable of producing and/or storing energy and the use thereof.

BACKGROUND

The principle of electricity generation by microbial degradation has been adopted in terms of different methodologies and technologies. The so-called Soil-MFC (SMFC) and Plant-MFC (PMFC) are two of the most attractive since they allow to obtain energy from nature itself, soil or plant respectively, at a low cost and without damaging the environment. However, these systems have certain disadvantages. In the natural environment, it has been shown that PMFCs can produce more power than SMFCs since plants provide nutrients that are used by the electrogenic microorganisms for energy production, creating an inexhaustible source of energy. On contrary, in the case of SMFCs, the continuous supply of organic matter is still a challenge to sustain long-term operations. However, PMFCs are limited to non-portable systems and the technology should be adapted to the place where it will be used. Thus, for closed and portable power devices, PMFCs are not useful due to the growth of the roots that ends up providing oxygen to the anode as well as causing damage to the electrode.

Double-Layer Biobatteries and Advantages Thereof

The present invention is focused on double-layer biobatteries. Double-layer biobatteries are capable of producing electricity by feeding on natural soil and using plants to maintain the ecosystem without damaging it.

The device consists of a self-containing fuel cell architecture for optimal transference of the battery from the laboratory to the field. This integral solution consists of a pot-like cell design where soil previously selected in the lab is introduced, and maintained under optimal conditions, with the same soil used in the lab and in a close device.

The double-layer battery has two independent compartments assembled in a single device. In the lower part is the biological battery, formed by the anode and the cathode separated by the soil. The last provides the organic matter and microorganisms needed to produce current. At the anode, microorganisms feed on organic matter producing protons, and electrons. In the absence of oxygen, these microorganisms send the electrons to the anode while the protons go through the wet soil to the cathode. Besides air enters through upper holes to reach the cathode. In turn, electrons arrive through an electrical circuit from the anode to react with oxygen and protons, leading to water and allowing energy production. The upper part includes a selected plant or the plants that grow naturally in the battery installation environment. Plants and the battery are connected in such a way that rainwater and irrigation leach nutrients and microorganisms from the soil are led to the battery while avoiding contact between plant root (if present) and anode.

For closed and portable power devices, soil powered batteries have several problems related to the continuous supply of organic matter above all, to sustain long-term operations. Besides, the battery performance depends on the microbial and organic matter quality of the soil.

The double-layer battery as developed is a device suitable for producing and/or storing energy with several advantages over traditional soil biobatteries. The device as disclosed herein with a double compartment allows to obtain a clean and non-polluting form of energy. In addition, this device can work underground, so that it is protected from sudden changes in temperature and adverse weather conditions. This can avoid a decrease in energy production and, therefore, allows a greater energy stability in addition to an increase in the durability of the system. The double compartment protects the device from erosion by roots or soil organisms, the contact between plant root (if present) and anode is avoided, and its configuration (upper compartment) allows an extra supply of nutrients and microorganisms. Thus, the depletion of nutrients is prevented, being a system capable of producing energy continuously. Furthermore, the lower compartment is configured so that it allows a greater control over the variability of the operation, achieving thereby a more stable and controlled energy production. The soil used is previously selected in the lab and then, battery can be installed in any environment or type of soil maintaining the biobattery under optimal operating conditions. Thus, when implemented in the field, the conditions inside the battery exactly replicate those of the laboratory, ensuring optimal performance at any environment condition. This device is a ready-to-use technology that can be used in any environment and place, without the need to adapt the system to the existing soil conditions, while avoiding contact between plant root (if present) and anode.

Biobatteries Vs. Double-Layer Biobatteries

Two main technologies derived from biobatteries are preferably considered for in field applications since obtaining the energy directly from nature, those that use only soil and those that also use plants [1]. Although with enormous similarities, they differ in the fuel supply. While in the former the organic matter for microbial energy production comes directly from the soil and depends on its initial composition, the nutrients supply in biobatteries with plants is continuous, resulting from plant photosynthesis [2].

The plant extends, therefore, the lifetime of bacteria and the fuel cell [2], but it also links power efficiency with any factor affecting plant metabolism, e.g. the number of daylight hours, the efficiency of the photosynthetic process or the allocation of organic matter from plant to soil [1,2]. Additionally, the production of oxygen in the plant-roots and its transport to the anode reduces the efficiency of the process, decreasing the number of electrons available and the anode potential [2]. Thus, there is no ideal biobattery, but each present advantages and disadvantage in power supply.

Additionally, although performing well in the laboratory, their problems start when implemented in field, under real environmental conditions, where plants and soil compositions widely different from those used in the lab [3].

For this, the double-layer solution allows to overcome the disadvantages while taking advantage of both technologies.

The document US 2017/077541 A1 relates to a microbial cell with an anode and a cathode using soil as a matrix. In contrast, the present invention is a double-layer device producing energy in a stable and efficient manner thanks to the two compartments, not just the biobattery. FIGS. 14 and 20-21 show approximations to the present invention, but they are not the same and neither would allow the advantages that the present invention provides. In particular, FIG. 14 shows a battery with a greening base layer on top in a detachable manner. However, soil is in close contact with cathode electrode, and oxygen have to arrive throughout the soil causing very important limitations in cathode reaction. Besides, cathode electrode is perforated to allow the passage of water carrying out electrical connexion problems and increase of internal resistance. FIGS. 20-21 show a cylindrical microbial fuel cell embedded in a soil layer. This design does not show the featured double layer design. The outer layer of the container is a material with an insulation layer. In the present invention, it is the second compartment that includes the soil and the water that can penetrate the compartment where the electrogenic bacteria are found, allowing an increase in the organic matter. In addition, according to the present invention, the battery does not use the soil in which it is buried. The present inventors provide a device for optimal transference from the laboratory to the field, in which soil previously selected in the lab is introduced and maintained under optimal conditions in the close device for environment application.

Furthermore, the double-layer battery has two independent compartments assembled in a single device. In the lower part is the biological battery, formed by the anode and the cathode separated by the soil. The upper part includes a selected plant or plants that grow naturally in the battery installation environment. Plants and the battery are connected in such a way that rainwater and irrigation leach nutrients and microorganisms from the soil are led to the battery, while avoiding contact between plant root (if present) and anode. Without the compartment in charge of protecting and disposing of organic matter, we would not have the advantages to which it gives rise. Thus, the present invention relates to a self-containing fuel cell architecture for optimal transference of the battery from the laboratory to the field. This integral solution consists of a pot-like cell design where soil previously selected in the lab is introduced, and maintained under optimal conditions, with the same soil used in the lab and in a close device.

Accordingly, the present inventors have developed a device suitable for producing and/or storing energy with a number of advantages over those already disclosed. The device as disclosed herein with a double compartment allows to obtain a clean and non-polluting form of energy. In addition, this device is able to work underground, so that it is protected from sudden changes in temperature and adverse weather conditions. This avoids a decrease in energy production and, therefore, allows a greater energy stability in addition to an increase in the durability of the system. The double compartment protects the device from erosion by roots or soil organisms avoiding the contact between plant root (if present) and anode and its configuration (upper compartment) allows an extra supply of nutrients and microorganisms.

Thus, the depletion of nutrients is prevented, being a system capable of producing energy continuously. Furthermore, the lower compartment is configured so that it allows a greater control over the variability of the operation, achieving thereby a more stable and controlled energy production. This device allows to obtain a ready-to-use technology that can be used in any environment and place, without the need to adapt the system to the existing soil conditions.

SUMMARY OF THE INVENTION

In a first aspect, the present invention relates to a device for producing energy as further defined in detail herein.

In a second aspect, the present invention relates to the use of a device as defined in the first aspect for producing and/or storing energy.

DETAILED DESCRIPTION

Figure 1:
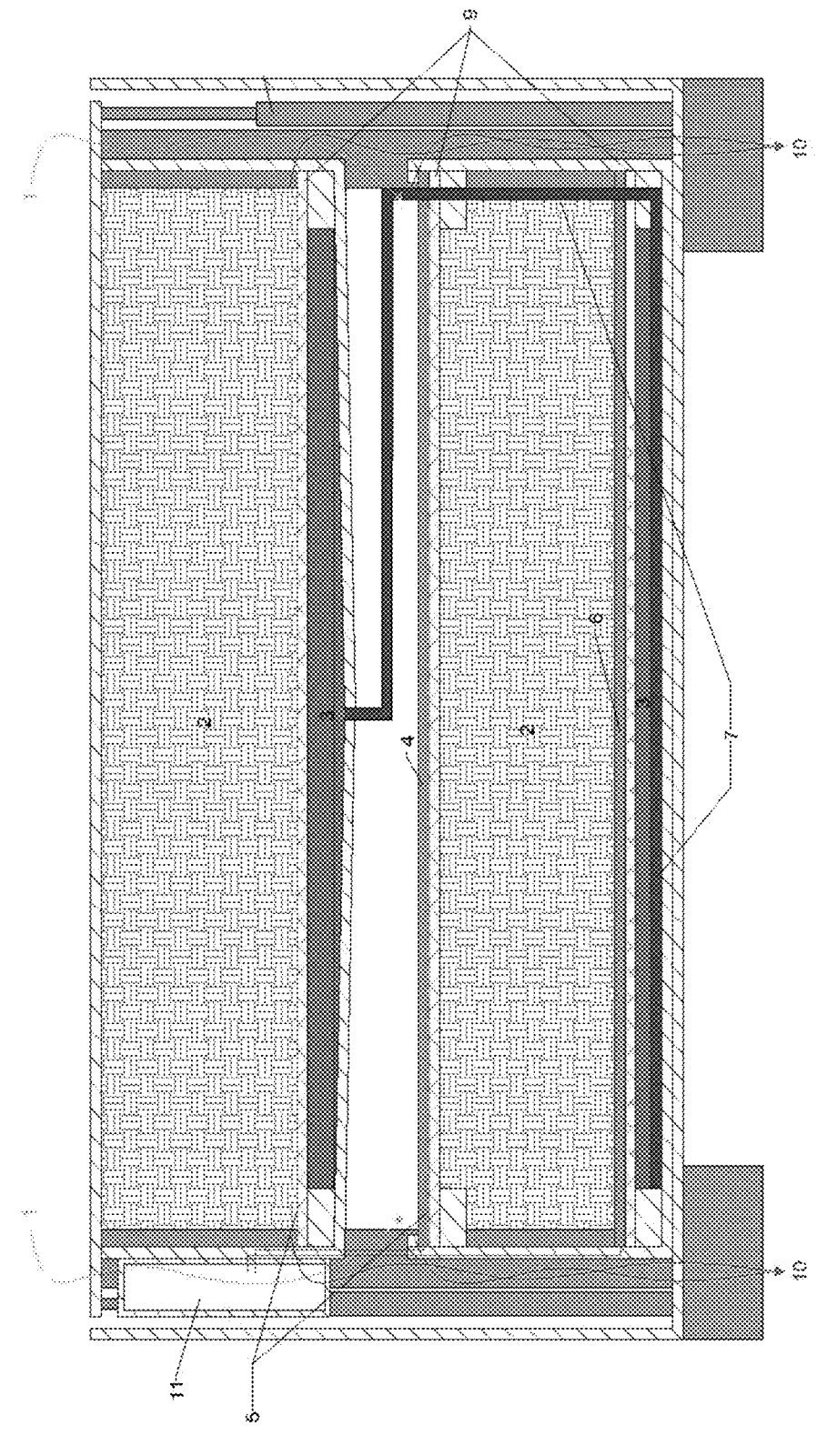
FIG. 1 shows schematically an example of a device according to the present invention including optional elements. wherein: 1. Air inlet; 2. Soil; 3. Leachate; 4. Cathode; 5. Filter; 6. Anode; 7. Leachate distribution pipes; 8. Piston; 9. Plastic Grill; 10. Excess leachate outlet; 11. Electronics. In this case, the battery designed in a larger size is formed in its upper compartment by soil and/or plants and can be used for example on roofs, terraces or gardens, being able to power self-watering systems or light points.

In a first aspect, the present invention relates to a device for producing energy, comprising:

a lower compartment, having said compartment a lower part which is the anode and a higher part which is the cathode, and further containing wet substrate between said lower part and said higher part, wherein said wet substrate contains at least one electrogenic microorganism and at least one electron donor;

an outdoor opened upper compartment in contact with an environment capable of supplying at least one electron donor and configured to transfer a liquid to the lower compartment through conductive means and;

conductive means for delivering at least one electron acceptor from outdoors to said cathode of the lower compartment through a gap between the lower and the upper compartment.

In this disclosure and in the claims, terms such as "comprises," "comprising." "containing" and "having" are open-ended terms and can mean "includes." "including," and the like; while terms like "consisting of" or "consists of" refer to the mentioned elements after these terms and others which are not mentioned are excluded.

Unless otherwise explained, all technical and scientific terms used herein have the same meaning as commonly understood by one of ordinary skill in the art to which this disclosure belongs. The singular terms "a", "an", and "the" include plural referents unless context clearly indicates otherwise. Similarly, the word "or" is intended to include "and" unless the context clearly indicate otherwise.

In a preferred embodiment, the liquid to be transferred to the lower compartment is selected from water, leachate from the substrate or a combination thereof. Accordingly, the device as defined in the present invention in the different embodiments is used so that the liquid to be transferred from the outdoor opened upper compartment to the lower compartment through conductive means is selected from water, leachate from the substrate or a combination thereof.

In another preferred embodiment, said at least one electron donor includes, but is not limited to, organic matter, phosphites, sulphur, hydrogen, nitrites, ferrous ion. Preferably, said electron donor is organic matter. Accordingly, the device as defined in the present invention in the different embodiments is used so that the at least one electron donor contained in the wet substrate or independently supplied by the environment in contact with the outdoor opened upper compartment includes, but is not limited to, organic matter, phosphites, sulphur, hydrogen, nitrites, ferrous ion, preferably said at least one electron donor in both cases is organic matter.

In another preferred embodiment, said at least one electron acceptor includes, but not limited to oxygen alone or included in a gas composition, manganese and iron compounds, and nitrates. Preferably, said at least one electron acceptor is air containing oxygen or only oxygen. Accordingly, the device as defined in the present invention in the different embodiments is used so that the at least one electron acceptor delivered from outdoors to said cathode of the lower compartment through a gap between the lower and the upper compartment includes, but is not limited to, oxygen alone or included in a gas composition, manganese and iron compounds, and nitrates, preferably said electron acceptor is air containing oxygen or only oxygen.

In another preferred embodiment, the anode is made of, but not limited to, carbon/graphite cloth, carbon/graphite felt, carbon paper, carbon rods and carbon fibers. Preferably, the anode is made of graphite felt or carbon (in any of the mentioned forms)

In another preferred embodiment, the cathode is made of, but not limited to, the same materials as those mentioned for the anode, platinum alone or combined with carbon, stainless steel mess, carbon nanotubes and cobalt-based materials. Preferably, the cathode is made of graphite felt, platinum or platinum combined with carbon.

In another preferred embodiment, said device further comprises at least one alive or non-alive organism in said upper compartment. Non limiting examples of said organism may include archaea, bacteria, actinomycetes, fungi, algae, protozoa, and larger soil fauna, for example springtails, mites, nematodes, earthworms, ants or insects.

In another preferred embodiment, the device further comprises at least one non-electrogenic microorganism. Said non-electrogenic microorganisms are well known in the art.

In another preferred embodiment, said at least one electrogenic microorganism and/or said at least one non-electrogenic microorganism is from a single genus or, if more than one, is a combination of microorganisms from different genera.

In a more preferred embodiment, the electrogenic microorganism as used in the present invention can be selected from, but not limited to, the species: *Shewanella, Geobacter, Pseudomonas, Rhodoferax, Bacillus* and *Clostridium.*

It is further noted that the electrogenic microorganism can work both in the anode producing energy and in the cathode catalyzing the reduction reaction.

In another preferred embodiment, the device further comprises a separator between said anode and said cathode in the lower compartment, preferably being said separator an ion exchange membrane. Said separator can be made of glass, plastic or any other suitable material.

In another preferred embodiment, the device further comprises at least one of:
    conduction means for driving the liquid out of the device in case of an excess thereof;
    at least one filter;
    at least one piston;
    at least one valve;
    a combination thereof.

Obviously, although not specifically mentioned when defining the device, an electronic part is also included in order to start up the system.

Said at least one filter can be located in the upper and/or lower compartment. In the upper compartment it is located under the substrate, just above the area where the liquid comes out (leachate) to prevent dirt, stones or other substances or organisms that can clog the conductive means. At the lower compartment, the filter is usually located under the cathode, protecting it from the substrate which is found below in order to prevent it from becoming excessively dirty, reducing thereby the active surface area. These filters, however, do allow the passage of liquids. The pore size of these filters can vary, but they are always above 0.2 μm to allow the passage of microorganisms.

Said at least one piston allow the device to be opened in order to make modifications inside the device.

Said at least one valve can be any suitable for the present system, such as electrovalves, ball regulating valves and needle regulating valves.

In another preferred embodiment, the device further comprises an energy storage system. This storage system allows to store the energy produced by the system on a continuous basis, which can allow to supply energy in a timely manner to other external devices.

In another preferred embodiment, the device is arranged so that at least one plant is deposited over the upper compartment for protecting the device from atmospheric and/or humidity changes. Said plant over the upper compartment may even be placed as a decorative element only.

In another preferred embodiment, the device is enclosed in an underground box with an outdoor opened upper side. Said box may have a size, for example, between 15 and 50 cm depending on the final purpose and the material could be for example PVC.

It is noted that any of the embodiments disclosed herein for the device according to the first aspect of the invention can be taken alone or combined with any other embodiment disclosed herein unless the context specifies otherwise.

As mentioned above, the present invention relates to a device able to produce energy consisting of two compartments. As an example of the technical working operation, in the lower part, the biological battery converts electrochemically the chemical energy of organic matter into electricity by means of bacteria metabolism. In this compartment, the anode is embedded in soil. Soil is a place for living of a great number of microorganisms, including those capable of energy generation named electrogenic microorganisms. Thus, electrogenic bacteria oxidize organic matter and generate electrons and protons. Because organic matter is more plentiful in soil and sediments, electron production by bacterial degradation is high. Electrogenic bacteria can transfer electrons to extracellular electron acceptors in this case, the anode. The anode absorbs the electrons and are transported through an external circuit to the cathode. At the same time, protons migrate throughout the soil to the cathode where combine with the electrons and oxygen that is reduced at the cathode surface producing current.

At the same time, the soil and plants present in the upper compartment provide an extra source of organic matter and microorganisms thanks to the different conduction means that connect both, upper and lower compartments. In turn, the upper compartment allows the protection of the biological battery from environmental changes and minimizes the environmental and visual impact of the device.

In a second aspect, the present invention relates to the use of the device according to any of the embodiments disclosed herein alone or in combination for producing and/or storing energy.

In a preferred embodiment, the device as disclosed herein in any of the embodiment alone or in combination is used for producing gases, such as methane, at the same time as producing and/or storing energy as previously defined, or for producing gases, such as hydrogen, when an external electric current is applied to said device.

Figure 2:
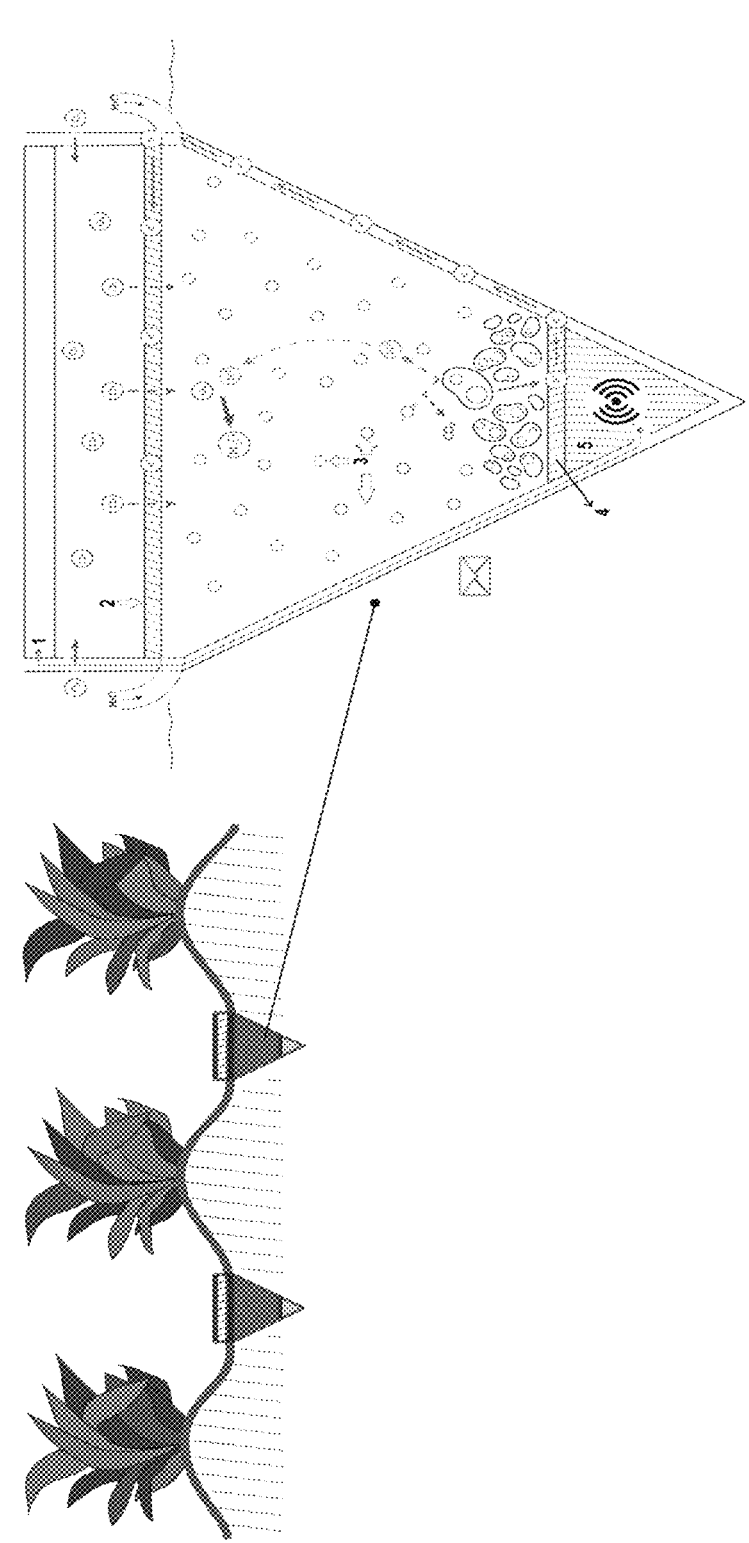
FIG. 2 shows a different version of an example of the device according to the present invention including optional elements, wherein: 1. Electronics; 2. Cathode; 3. Organic matter; 4. Anode; 5. Sensor. This figure represents a small version of the double compartment biological battery. In this case, the biological battery is underground and the upper compartment is formed by the surrounding soil. This version can be applied to power a small device, for example a sensor.

Furthermore, and as already explained for FIGS. 1 and 2, the device as shown in FIG. 1 can be used for example on roofs, terraces or gardens, being able to power self-watering systems or light points; whereas that as shown in FIG. 2 is more suitable for use in powering low consumption electronic devices, such as a sensor.

The present disclosure also relates to a process for producing and/or storing energy comprising the step of using the device according to any of the embodiments disclosed herein.

A number of examples will be provided below that are intended to illustrate the invention and in no way limit the scope of the invention, which is established by the attached claims.

EXAMPLES

Example 1: Comparison of PMFC and SMFC Performance in Closed Devices

The performance in a long-term operation of 1 month has been compared between three PMFCs using *Canna indica* and three SMFCs.

Figure 3A:
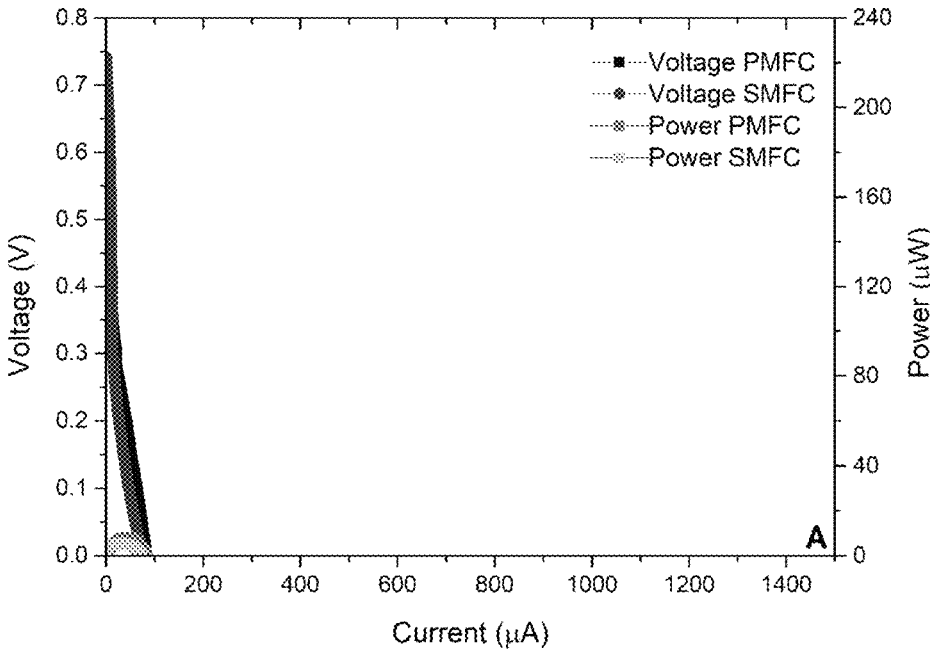
FIG. 3 shows Intensity-Voltage (IV) curves and power curves obtained by one of the PMFC and SMFC devices at the beginning of the experiment (A) and after 3 weeks of operation.
Figure 3B:
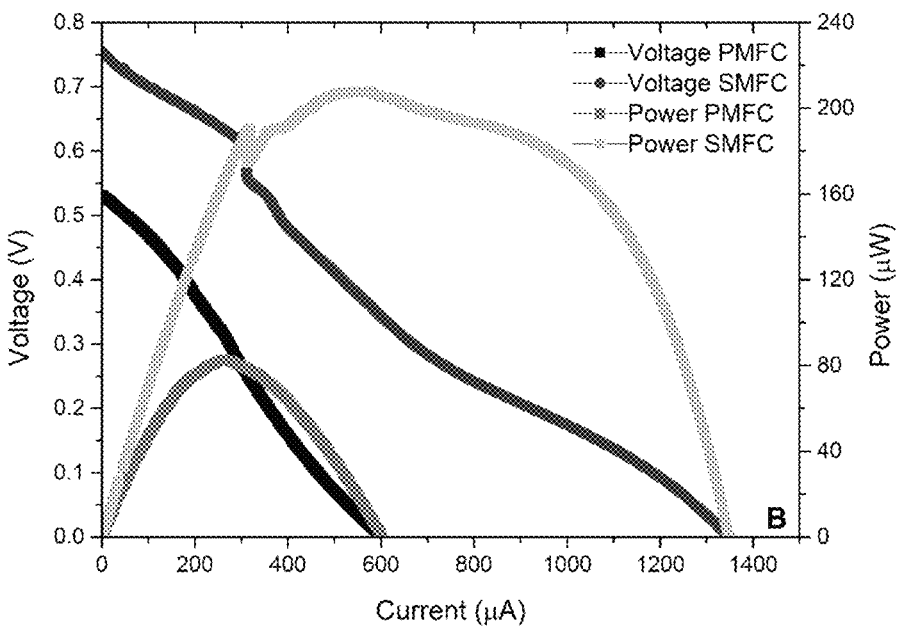

In general, PMFC performance has been proved lower than soil-MFC's in our set-up comprising a small and closed pot. As it can be observed in FIG. 1, although performance in terms of maximum power and current was very similar at the beginning of the experiment (FIG. 3A), after 3 week of operation PMFC performance was substantially less (FIG. 3B).

It was demonstrated that the roots of the plants completely entangle the anode and tear the electrode fabric. Additionally, the roots of the plant species that tolerate a flooded soil, which is needed to the PMFC operation, are proven able to develop an aerenchyma: a specialized tissue that allows the flow of oxygen from the top of the plant to the roots that are underwater to prevent hypoxia; this tissue lets the oxygen flow outside the root to the external medium. Consequently, the anaerobic conditions required in the anode are disturbed by the oxygen flow from the close aerenchyma.

Figure 4:
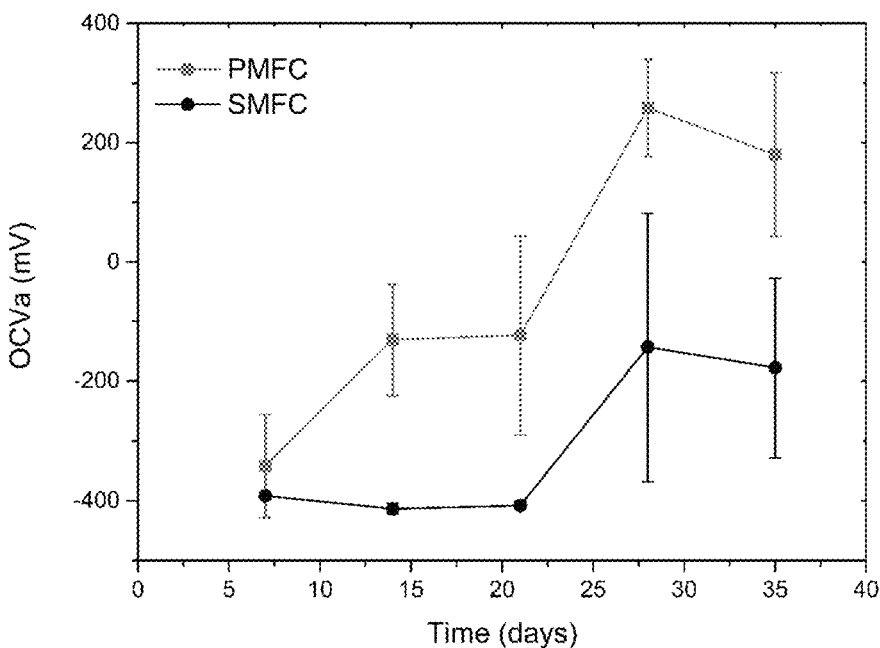
FIG. 4 shows the variation over time of the anode potential of PMFCs and SMFCs.

All this leads to a loss of the anode potential (FIG. 4) which tends to more positive potentials and therefore, a low energy production.

In conclusion, in our device, the sole purpose of plants in the upper compartment is maintaining the natural biosphere and reducing the visual impact that can produce the energy production device on the natural environment, being an optional component in this system.

Example 2: Electrical Performance of the Power Device

The demonstration of the viability of the present invention has been carried out using a two-compartment device of a total size of 37 cm per side and a volume per compartment of about 11 $cm^3$ filled with a rich horticultural substrate. Electrodes (anode and cathode) made of graphite felt had an area of 0.36 $m^2$. The device was tested over time by performing IV and power curves. The results demonstrate the viability and good performance of the device producing 3085 J of energy for 1 month.

Figure 5:
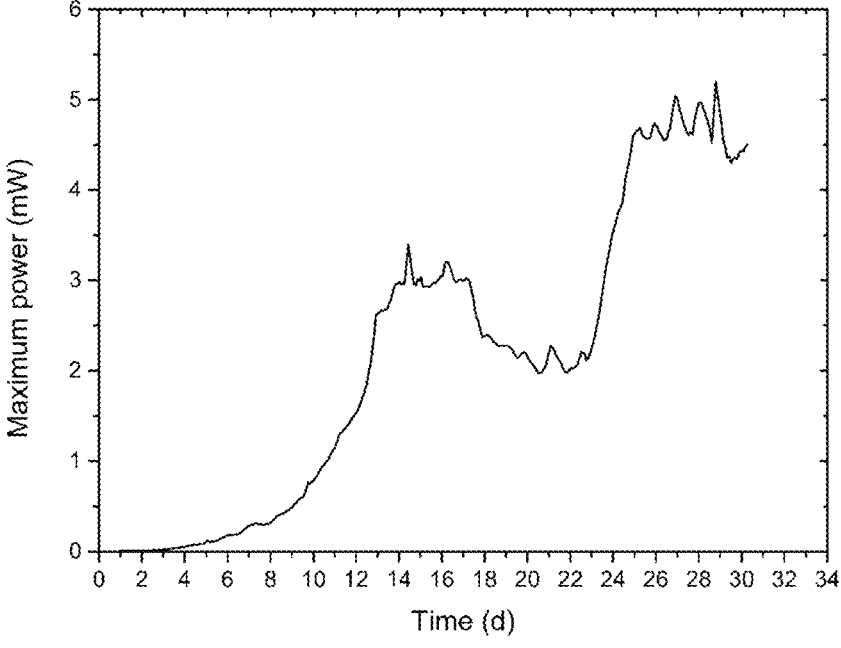
FIG. 5 shows the maximum power value obtained from power curves performed during the experiment (example 2).

In FIG. 5 maximum power values obtained by daily power curves are represented showing and increase along the time, indicating a good growth of bacteria on the anode.

Figure 6:
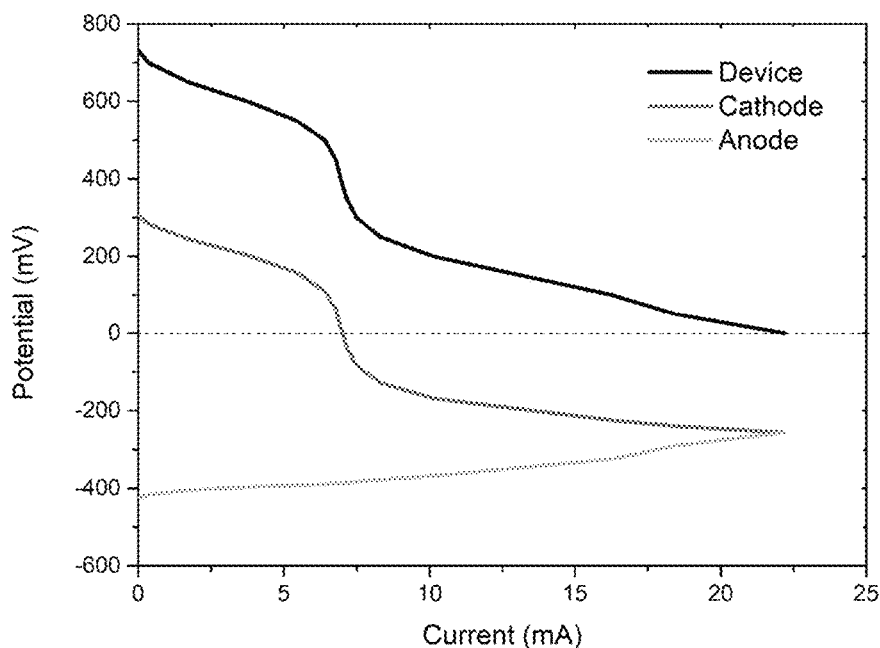
FIG. 6 shows IV-curve of the device after 31 days of operation and anode and cathode potentials measured during the IV-curve.

Additionally, FIG. 6 shows a good anode performance with very small variations of the anode potential with the increase of current.

Example 3. Comparative Example with Double-Layer Vs Single Layer Biobatteries

3.1 Objective

The issues related to biological batteries for real life applications are their implementation and operation in the natural environment. In the case of batteries based on soil organic matter and microorganisms, performance and efficiency in energy production are strongly linked to soil characteristics. For this reason, the characteristics and quality of the soil at the implementation location influence the operation and energy performance of these device, generating great variability and uncertainty. The objective of this experiment is to demonstrate the great advance and the advantages that the innovation presented produces by reducing variability and increasing efficiency. The experiment intends to demonstrate the reduction of variability and improvement in performance produced by double-layer batteries compared to classic single-layer biological batteries.

3.2. Experimental Design

Figure 7:
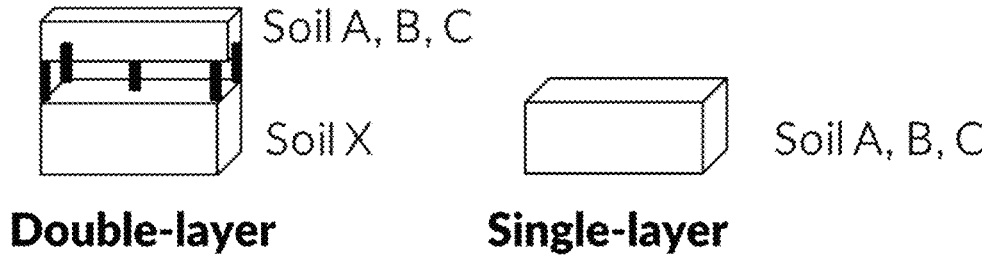
FIG. 7. Schematic representation of the experimental design carried out in comparative example 3.

Three different types of soil (from this point on, A, B and C soil) were compared using double-layer and single-layer reactors in terms of current production and variability. In the case of double-layer reactors, these soils were used for filling the upper part, while the soil of the biological battery (lower part) was the same, a defined and previously selected soil (soil X) (FIG. 7). A total of 2 replicates for each different condition were constructed using the same setup.

The biological batteries were monitored using an Arduino based circuit where the voltage was continuously sweeping, from maximum voltage down to 0 V and from 0 V to its maximum value, in a 2 h cycle. Under these working conditions the voltage and the current of each battery was acquired.

Additionally, the variation coefficients (VC) of the biological batteries in terms of current within replicates with same soil and in terms of the soil used between the different technologies compared (double-layer and single-layer) were calculated as follows:

$$VC\ (\%) = (SD/X) \cdot 100, \text{ where } X \text{ is the average of the group of data studied and SD the standard deviation.}$$

It is considered that samples with Variation coefficients higher than 30% are non-homogeneous samples.

3.3 Results

Figure 8:
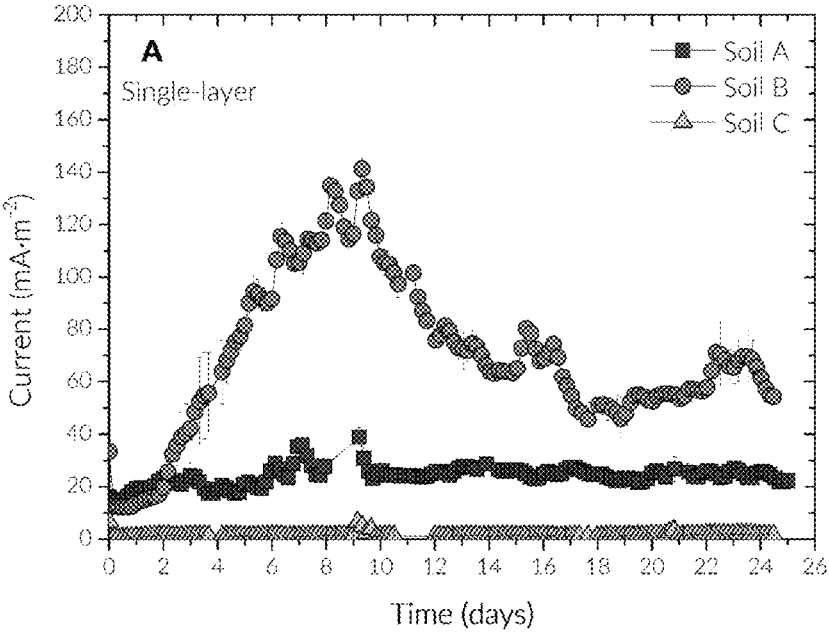
FIG. 8. Maximum current density obtained during the experiment in comparative example 3 by the different types of soil in single-layer reactors (A) and double-layer reactors (B).
Figure 8:
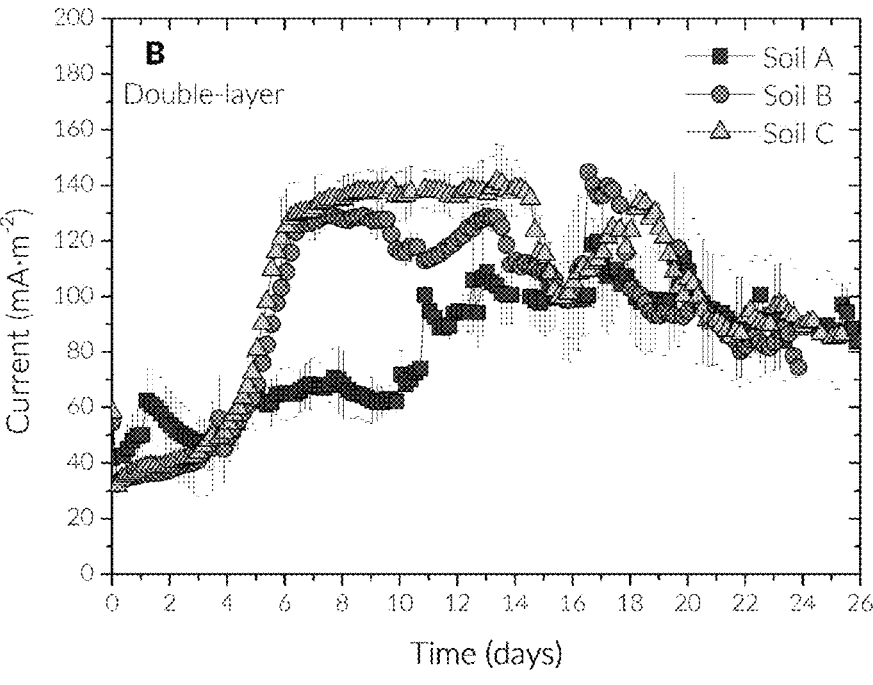

In FIG. 8, the average and standard deviation of the current values obtained by the replicates of the different conditions studied (three different soils in two different reactors) are represented.

The results obtained by the single-layer batteries using the different soils (FIG. 8A) showed high variability with big differences in the current values obtained. In Table 1, the current average obtained along the time after the first 6 days of operation (considered the time to biofilm maturation and to reach stable values) is showed. Values between $77.7\pm25.72$ mA·m$^{-2}$ (Soil B) and $1.6\pm0.75$ mA·m$^{-2}$ (Soil C) were calculated in traditional single-layer bio-batteries with a VC between replicates between 73.42 (Soil A) and 33.09% (Soil B), in all cases VCs above the 30% limit for homogeneous samples.

The current values presented by the double-layer reactors showed more stable and similar values despite using different soils (FIG. 8B). Thus, the current average in these reactors was found between $74.26\pm22.07$ mA·m$^{-2}$ and $97.54\pm22.85$ mA·m$^{-2}$ with CV between replicates lower than 30% in all cases.

When the average current obtained with all the soils for both reactors (Table 1) was compared, we observed a higher average current in the case of double-layer reactors, being $87.12\pm11.83$ mA·m$^{-2}$ the current obtained by these, and $39.47\pm38.05$ mA·m$^{-2}$ the current obtained by single-layer reactors. In addition, after calculating the CV to evaluate the variability in each type of reactor when using different soils, large values of variability for single-layer reactors in relation to those obtained by the double-layer reactors were observed, 96.4% and 13.57% respectively.

TABLE 1

Average and standard deviation of the current density obtained after biofilm growth and stabilization of the current production, and variation coefficient calculated between replicates using the same soil and different soils using the same type of reactor.

| | Current average (mA · m$^{-2}$) | Variation Coefficient (%) |
| --- | --- | --- |
| Single-layer reactor | 39.47 ± 38.05 | 96.4 |
| Soil A | 39.09 ± 28.7 | 73.42 |
| Soil B | 77.7 ± 25.72 | 33.09 |
| Soil C | 1.6 ± 0.75 | 46.85 |
| Double-layer reactor | 87.12 ± 11.83 | 13.57 |
| Soil A | 74.26 ± 22.07 | 29.7 |
| Soil B | 89.55 ± 17.33 | 19.35 |
| Soil C | 97.54 ± 22.85 | 23.42 |

3.4. Conclusions

From the performed experiment and the obtained results, it has been possible to demonstrate:

the existing problem in the transfer of these technologies to the natural environment since the installation environment greatly affects the energy performance of the biobattery.

the enormous variability presented by conventional devices makes them commercially unviable.

the innovative solution presented, the double-layer biological battery, represents a great improvement reducing variability and improving stability in current production.

The invention claimed is:

1. A double-layer biological battery for producing energy, comprising:

a lower compartment having a first part configured as an anode, a second part configured as a cathode, and a wet substrate between said first part and said second part, wherein said wet substrate contains at least one electrogenic microorganism and at least one electron donor;

an upper compartment having an opening configured to be in contact with an environment capable of supplying at least one electron donor, the upper compartment being configured to transfer a liquid to the lower compartment;

a conductive means configured to deliver at least one electron acceptor to said cathode through a gap between the lower compartment and the upper compartment; and at least one filter with a pore size above 0.2 μm, wherein the at least one filter is configured to allow passage of microorganisms from the upper compartment to the lower compartment.

2. The double-layer biological battery according to claim 1, wherein said upper compartment is configured to transfer to the lower compartment a liquid selected from water, leachate from the substrate, or a combination thereof.

3. The double-layer biological battery according to claim 1, wherein said wet substrate contains organic matter as the at least one electron donor.

4. The double-layer biological battery according to claim 1, wherein the at least one electron donor from the environment comprises organic matter.

5. The double-layer biological battery according to claim 1, wherein the at least one electron acceptor comprises air containing oxygen or only oxygen.

6. The double-layer biological battery according to claim 1, wherein the anode comprises graphite felt or carbon and the cathode is comprises graphite felt, platinum, or platinum combined with carbon.

7. The double-layer biological battery according to claim 1, further comprising at least one organism in said upper compartment.

8. The double-layer biological battery according to claim 1, further comprising at least one non-electrogenic microorganism.

9. The double-layer biological battery according to claim 8, wherein said at least one electrogenic microorganism and/or said at least one non-electrogenic microorganism is from a single genus or, if more than one, is a combination of microorganisms from different genera.

10. The double-layer biological battery according to claim 1, wherein the lower compartment comprises a separator between said anode and said cathode.

11. The double-layer biological battery according to claim 1, further comprising at least one of:

conduction means for driving excess liquid out of the double-layer biological battery;

at least one piston; and at least one valve.

12. The double-layer biological battery according to claim 1, further comprising an energy storage system.

13. The double-layer biological battery according to claim 1, wherein the double-layer biological battery is arranged so that at least one plant is depositable over the upper compartment for protection from atmospheric and/or humidity changes.

14. The double-layer biological battery according to claim 1, wherein the double-layer biological battery is configured to be enclosed in an underground box with an outdoor opened upper side.

15. A method for producing and/or storing energy, the method comprising:

providing a double-layer biological battery according to claim 1; and operating said double-layer biological battery to produce and/or store energy.

16. A method for producing one more gases, the method comprising:

providing a double-layer biological battery according to claim 1;

operating said double-layer biological battery to produce one or more gases at the same time as producing and/or storing energy; and/or applying an external electric current to said double-layer biological battery to produce the one or more bases.

17. The method according to claim 16, wherein the one or more gases include methane.

18. The method according to claim 16, wherein the one or more gases include hydrogen.

19. The double-layer biological battery according to claim 10, wherein the separator includes an ion exchange membrane.

20. A double-layer biological battery for producing energy, comprising:

a lower compartment having a first part configured as an anode, a second part configured as a cathode, and a wet substrate between said first part and said second part, wherein said wet substrate contains at least one electrogenic microorganism and at least one electron donor;

an upper compartment having an opening configured to be in contact with an environment capable of supplying at least one electron donor, the upper compartment being configured to transfer a liquid to the lower compartment;

a conductive means configured to deliver at least one electron acceptor to said cathode through a gap between the lower compartment and the upper compartment; and at least one filter configured to allow passage of microorganisms from the upper compartment to the lower compartment.

\* \* \* \* \*